United States Patent
Kunimatsu et al.

(10) Patent No.: US 8,593,596 B2
(45) Date of Patent: Nov. 26, 2013

(54) LIQUID CRYSTAL DISPLAY DEVICE

(75) Inventors: Noboru Kunimatsu, Chiba (JP); Yuko Matsumoto, Onjuku (JP); Yasushi Tomioka, Mobara (JP); Masateru Morimoto, Mobara (JP); Atsuhiro Katayama, Mobara (JP)

(73) Assignee: Hitachi Displays, Ltd., Mobara-shi, Chiba (JP)

( * ) Notice: Subject to any disclaimer, the term of this patent is extended or adjusted under 35 U.S.C. 154(b) by 100 days.

(21) Appl. No.: 13/397,841

(22) Filed: Feb. 16, 2012

(65) Prior Publication Data

US 2012/0224131 A1 Sep. 6, 2012

(30) Foreign Application Priority Data

Mar. 2, 2011 (JP) .................................. 2011-045502

(51) Int. Cl.
*G02F 1/1337* (2006.01)
(52) U.S. Cl.
USPC .......................................... 349/110; 349/123

(58) Field of Classification Search
USPC .................................................. 349/110, 123
See application file for complete search history.

(56) References Cited

FOREIGN PATENT DOCUMENTS

JP 10221700 8/1998

*Primary Examiner* — Phu Vu
(74) *Attorney, Agent, or Firm* — Ulmer & Berne LLP

(57) ABSTRACT

In the step of curing a resin for bonding a TFT substrate and a counter substrate each having an alignment film that has been optically aligned by using UV-light, damage to the alignment film due to the UV-light can be prevented without using a light shielding mask. A UV-light absorption layer is formed between each black matrix on the counter substrate. The TFT and the counter substrates are sealed at their periphery by a resin that is cured by UV-light radiated from the counter substrate side. Since the absorption layer has a high absorbability to UV-light at a wavelength of 300 nm or less that degrades the alignment film, damage to the alignment film due to the UV-light for curing the resin can be prevented. Thus, provision of a light shielding mask for shielding the UV-light for the display region can be saved.

8 Claims, 6 Drawing Sheets

| WAVELENGTH | EXISTENT EMBODIMENT | | EMBODIMENT 1 | |
|---|---|---|---|---|
| | SEAL PORTION | DISPLAY PORTION | SEAL PORTION | DISPLAY PORTION |
| 300nm | 10.8% | 2.7% | 10.8% | 0.6% |
| 340nm | 26.6% | 13.6% | 26.6% | 19.9% |

| WAVELENGTH | EXISTENT EMBODIMENT | | EMBODIMENT 1 | | EMBODIMENT 2 | |
|---|---|---|---|---|---|---|
| | SEAL PORTION | DISPLAY PORTION | SEAL PORTION | DISPLAY PORTION | SEAL PORTION | DISPLAY PORTION |
| 300nm | 10.8% | 2.7% | 10.8% | 0.6% | 2.7% | 0.2% |
| 340nm | 26.6% | 13.6% | 26.6% | 19.9% | 65.9% | 49.2% |

LIQUID CRYSTAL DISPLAY DEVICE

CLAIM OF PRIORITY

The present application claims priority from Japanese Patent Application JP 2011-045502 filed on Mar. 2, 2011, the content of which is hereby incorporated by reference into this application.

BACKGROUND OF THE INVENTION

1. Field of the Invention

The present invention relates to a liquid crystal display device. The invention more particularly relates to a liquid crystal display device including an alignment film provided with alignment controllability by irradiation of light.

2. Description of the Related Art

Liquid crystal display devices include a TFT substrate having pixel electrodes, thin film transistors (TFTs), etc. formed in a matrix; a counter substrate opposing the TFT substrate and having black matrices and an overcoat film, etc.; and liquid crystals put between the TFT substrate and the counter substrate. Images are formed by controlling the light transmittance of the liquid crystal molecules of each pixel.

Since liquid crystal display devices are flat and light in weight, they are applied in various fields, for example, from large-sized display devices such as television sets to mobile phones and DSCs (Digital Still Cameras). For liquid crystal display devices, the view angle characteristic issues a problem. The view angle characteristic is a phenomenon such that the luminance or chromaticity changes from that of when the screen is viewed from the front, when, the screen is viewed from an oblique direction. The IPS (In Plane Switching) system which operates liquid crystal molecules by a horizontal electric field has a good view angle characteristic.

As a method of alignment treatment, that is, a method for giving alignment controllability to an alignment film used for liquid crystal display devices, rubbing treatment has been used in the conventional art. Rubbing treatment is performed by rubbing an alignment film with a cloth. On the other hand, there is a method called an optical alignment method which can provide alignment controllability to an alignment film in a contactless manner. Since the performance of the IPS system is better as the pre-tilt angle is smaller, the optical alignment method which in principle does not generate a pre-tilt angle is advantageous.

The TFT substrate and the counter substrate are bonded at their periphery with a seal material; as the seal material, UV-curable resin is often used. When the display region in which the alignment film is formed is irradiated with UV-light to cure the seal material, the UV-light deteriorates the alignment film. Conventionally, a light shielding mask has been used so that the display region is not irradiated with UV-light upon the UV-irradiation against the seal material.

However, even when such a mask is used, the UV-light comes around to deteriorate the alignment film at the periphery of the display region. JP-A-H10-221700 discloses a configuration in which the counter substrate is provided with a band pass filter surrounding the outer side of the display region so that it cuts off the UV-light, thereby protecting the alignment film and liquid crystals in the display region from the UV-light by the combination of the light shielding mask and the band pass filter.

SUMMARY OF THE INVENTION

In a conventional configuration in which a light shielding mask is provided to shroud the display region at the time the seal material is cured by UV-light irradiation, it is necessary to align the light shielding mask to a predetermined position upon exposure. Thus, fabrication steps for this process would be added, and it is also necessary to prepare various sizes and kinds of light shielding masks.

Further, in a configuration as described in JP-A-H10-221700 in which the counter substrate is provided with a band pass filter formed around the periphery of the display region, there is an overlap between the band pass filter and the seal material. The effect of the band pass filter on the curing of the seal material needs to be taken into consideration. It is also necessary matters such as the bondability between the band pass filter and the seal material as well as the black matrix, etc. around it. Further, even when the band pass filter is formed, a light shielding mask will still be needed.

The present invention intends to attain a liquid crystal display device employing an alignment film obtained by optical alignment and a UV-light curable resin for a seal material, which does not require the use of a UV-light shielding mask upon UV-curing of the seal material.

The present invention intends to overcome the problems described above and provides, in a first aspect, a liquid crystal display device comprising: a TFT substrate having an alignment film; a counter substrate having an alignment film, the counter substrate being bonded to the TFT substrate by means of a seal material; and liquid crystals sealed inside the substrates and the seal material; wherein a UV-light absorption layer is formed between each black matrix, the black matrices and the UV-light absorption layer being covered by an overcoat film, the overcoat film being covered by the alignment film; the seal material is a UV-light curable resin; and the transmittance of the UV-light absorption layer to UV-light at a wavelength of 300 nm is lower than that of the overcoat film, and the transmittance of the UV-light absorption layer to UV-light at a wavelength of 340 nm is higher than that of the overcoat film.

The present invention provides, in a second aspect, a liquid crystal display device comprising: a TFT substrate having an alignment film; a counter substrate having an alignment film, the counter substrate being bonded to the TFT substrate by means of a seal material; and liquid crystals sealed inside the substrates and the seal material; wherein a UV-light absorption layer is formed between each black matrix and over the black matrices, and the alignment film is formed over the UV-light absorption layer; the TFT substrate is covered by a TFT circuit and an organic passivation film covering the TFT circuit, and over the organic passivation film, counter electrodes, an interlayer insulation film, and pixel electrodes are formed in that order, or in the order of the pixel electrodes, the interlayer insulation film, and the counter electrodes; the alignment film is formed over the pixel electrodes or the counter substrate; the seal material is a UV-light curable resin; and the transmittance of the UV-light absorption layer to UV-light at a wavelength of 300 nm is lower than that of the organic passivation film, and the transmittance of the UV-light absorption layer to UV-light at a wavelength of 340 nm is higher than that of the organic passivation film.

The present invention provides, in a third aspect, a liquid crystal display device comprising: a TFT substrate having an alignment film; a counter substrate having an alignment film, the counter substrate being bonded to the TFT substrate by means of a seal material; and liquid crystals sealed inside the substrates and the seal material; wherein a color filter is formed between each black matrix, the black matrices and the color filters being covered by an overcoat film, the overcoat film being covered by the alignment film; the TFT substrate is covered by a TFT circuit and a UV-light absorption layer covering the TFT circuit, and over the UV-light absorption layer, counter electrodes, an interlayer insulation film, and pixel electrodes are formed in that order, or in the order of the pixel electrodes, the interlayer insulation film, and the counter electrodes; the alignment film is formed over the pixel electrodes or the counter substrate; the seal material is a UV-curable resin; and the transmittance of the UV-light absorption layer to UV-light at a wavelength of 300 nm is lower than that of the overcoat film, and the transmittance of the UV-light absorption layer to UV-light at a wavelength of 340 nm is higher than that of the overcoat film.

The present invention provides, in a fourth aspect, a liquid crystal display device comprising: a TFT substrate having an alignment film; a counter substrate having an alignment film, the counter substrate being bonded to the TFT substrate by means of a seal material; and liquid crystals sealed inside the substrates and the seal material; wherein a UV-light absorption layer is formed between each black matrix, the black matrices and the UV-light absorption layer being covered by an overcoat film, the overcoat film being covered by the alignment film; the TFT substrate is covered by a TFT circuit and a UV-light absorption layer covering the TFT circuit, and over the UV-light absorption layer, counter electrodes, an interlayer insulation film, and pixel electrodes are formed in that order, or in the order of the pixel electrodes, the interlayer insulation film, and the counter electrodes; the alignment film is formed over the pixel electrodes or the counter substrate; the seal material is a UV-curable resin; and the transmittance of the UV-light absorption layer to UV-light at a wavelength of 300 nm is lower than that of the overcoat film and that of the organic passivation layer, and the transmittance of the UV-light absorption layer to UV-light at a wavelength of 340 nm is higher than that of the overcoat film and that of the organic passivation layer.

According to the present invention, the UV-light absorption layer that absorbs UV-light at a wavelength of 300 nm or less is formed in the display region. Therefore, damaging to the alignment film by the UV-light can be prevented during the UV-irradiation for sealing the TFT substrate and the counter substrate having the alignment films by means of the UV-light curable seal material. Since a light shielding mask for protecting the display region against the UV-light radiated in the UV-irradiation step can be saved, the manufacturing cost of the liquid crystal display device can be reduced.

DESCRIPTION OF THE PREFERRED EMBODIMENTS

Prior to the explanation of the embodiments of the present invention, the configuration of an IPS liquid crystal display device to which the present invention is applied is described.

Figure 9:
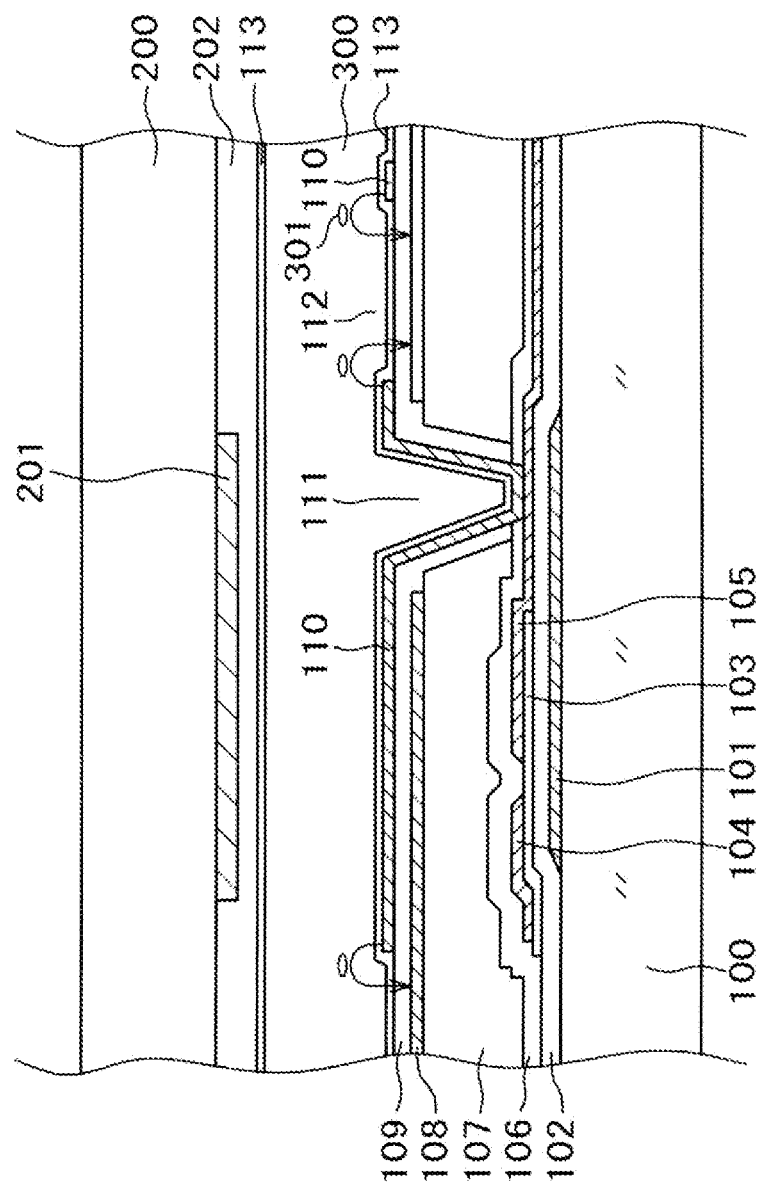
FIG. 9 is a cross sectional view of a display region of an IPS liquid crystal display device.

FIG. 9 is a cross sectional view showing a structure in a display region of an IPS liquid crystal display device. The structure shown in FIG. 9 is the structure generally used at present. In brief, a comb-teeth pixel electrode 110 is formed over a counter electrode 108 formed in a solid coated form with an insulation film 109 put between them. Liquid crystal molecules 301 are rotated by the voltage between the pixel electrode 110 and the counter electrode 108, and the light transmittance of the liquid crystal layer 300 of each pixel is controlled to thereby form an image.

In FIG. 9, a gate electrode 101 is formed over a TFT substrate 100 formed of glass. The gate electrode 101 is formed in the same layer as the scanning line. The gate electrode 101 is formed from an AlNd alloy and a MoCr alloy stacked thereover.

A gate insulation film 102 of SiN is formed covering the gate electrode 101. A semiconductor layer 103 of an a-Si film formed of is formed over the gate insulation film 102 at a position opposing the gate electrode 101. The a-Si film forms a channel portion of the TFT, and over the a-Si film, a drain electrode 104 and a source electrode 105 are formed with the channel portion put between them. An n+Si layer (not shown) is formed between the a-Si film and the drain electrode 104 or the source electrode 105. The n+Si layer is for establishing ohmic contact between the semiconductor layer 103 and the drain electrode 104 or the source electrode 105.

The drain electrode 104 also serves as a video signal line, and the source electrode 105 is connected with the pixel electrode 110. The drain electrode 104 and the source electrode 105 are formed simultaneously in the same layer. In this embodiment, the drain electrode 104 or the source electrode 105 is formed of MoCr alloy. When it is desired to lower the electric resistance of the drain electrode 104 or the source electrode 105, for example, an electrode structure such that an AlNd layer is put between MoCr alloys is used.

An inorganic passivation film 106 of SiN is formed to cover the TFT. The inorganic passivation film 106 protects, particularly, the channel portion of the TFT against impurities. An organic passivation film 107 is formed over the inorganic passivation film 106. Since the organic passivation film 107 also has a function of planarizing the surface as well as protecting the TFT, the film is formed thick. The thickness is from 1 μm to 4 μm.

A counter electrode 108 is formed over the organic passivation film 107. The counter electrode 108 is formed by sputtering ITO (Indium Tin Oxide), a transparent conductive film, over the entire display region. That is, the counter electrode 108 is formed in a planar form. After the counter electrode 108 is formed over the entire surface by sputtering, a portion of the counter electrode 108 is removed by etching to form a through hole 111 so as to establish conduction between the pixel electrode 110 and the source electrode 105.

An interlayer insulation film 109 of SiN is formed covering the counter electrode 108. After the interlayer insulation film 109 is formed, the through hole 111 is formed by etching. The through hole 111 is formed by etching the inorganic passivation film 106 using the interlayer insulation film 109 as a resist.

Then, ITO which will be the pixel electrode 110 covering the interlayer insulation film 109 and the through hole 111 is formed by sputtering. The pixel electrode 110 is formed by pattering the sputtered ITO. ITO as the pixel electrode 110 is deposited in the through hole 111 as well. The source electrode 105 extending from the TFT and the pixel electrode 110 are connected via the through hole 111 so that video signals are supplied to the pixel electrode 110.

Figure 10:
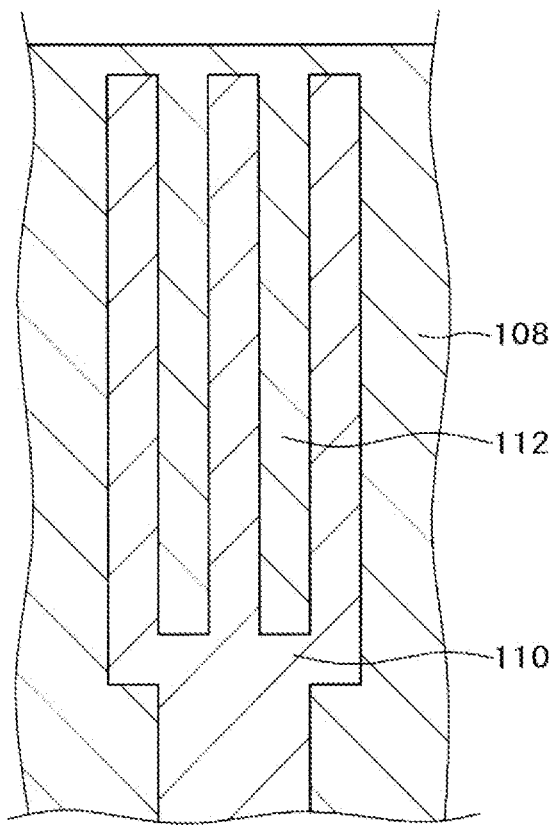
FIG. 10 is a plan view showing an example of a pixel electrode of the IPS liquid crystal display device.

FIG. 10 shows an example of the pixel electrode 110. The pixel electrode 110 is a comb-teeth electrode. Slits 112 are formed between the comb-teeth. A planar counter electrode 108 is formed below the pixel electrode 110 with an interlayer insulation film 109 not illustrated put between them.

When video signals are applied to the pixel electrode 110, liquid crystal molecules 301 are rotated by the lines of electric force generated between the pixel electrode 110 and the counter electrode 108 through the slit 112. The light transmitting the liquid crystal layer 300 is thus controlled, and thereby an image is formed.

Returning to FIG. 9, an alignment film 113 for aligning the liquid crystal molecules 301 is formed over the pixel electrode 110. In FIG. 9, a counter substrate 200 is disposed with a liquid crystal layer 300 put between them. Since the device shown in FIG. 9 is a monochromatic liquid crystal display device, a black matrix 201 and an overcoat film 202 covering it are formed at the inner side of the counter substrate 200.

While the black matrix 201 is for improving the contrast, it also functions as a light shielding film for the TFT. The overcoat film 202 is formed to moderate the roughness of the surface. An alignment film 113 for determining the initial orientation of the liquid crystals is formed over the overcoat film 202. The alignment film 113 of the counter substrate side is also processed with an alignment treatment by optical alignment in the same manner as for the alignment film 113 of the TFT substrate side.

Although not illustrated in FIG. 9, a columnar spacer made of resin is formed on the counter substrate side in order to define the gap between the TFT substrate 100 and the counter substrate 200. Since the device of FIG. 9 is a monochromatic liquid crystal display device, color filters are not present. In color liquid crystal display devices, color filters of colors such as red, green, blue, etc. are formed at both sides of the black matrix 201.

FIG. 9 shows a configuration in which the counter electrode 108 is formed over the organic passivation film 107, and the comb-teeth pixel electrode 110 is disposed thereover with the interlayer insulation film 109 put between them. By contrast, there is also an IPS device of a configuration in which the pixel electrode 110 is disposed over the organic passivation film 107, and a comb-teeth counter electrode 108 is disposed thereover with the interlayer insulation film 109 put between them. The present invention can be applied to either of the types of IPS.

Figure 11:
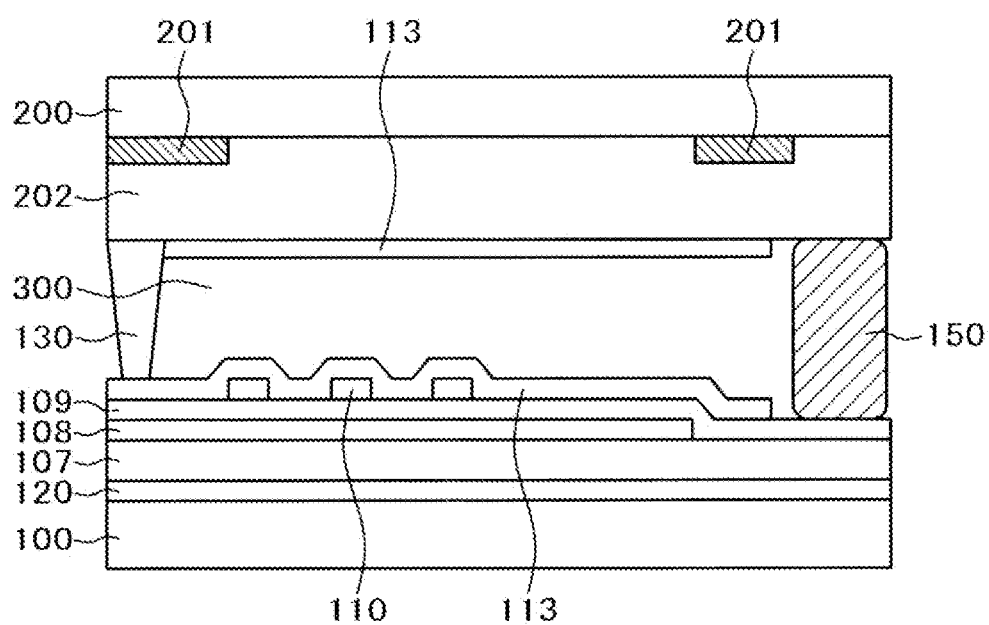
FIG. 11 is a cross sectional view of the display region and the seal portion of the IPS liquid crystal display device.

FIG. 11 is a cross sectional view of the display region and the seal portion of the IPS liquid crystal display device shown in FIG. 9 employing optical alignment.

In FIG. 11, the part from the gate electrode 101 to the inorganic passivation film 106 in FIG. 9 are collectively illustrated a TFT circuit 120. In FIG. 11, the TFT circuit 120 is formed over a TFT substrate 100, an organic passivation film 107 is formed thereover, and a common electrode 108 painted in a solid form is formed over the organic passivation film 107. A comb-teeth pixel electrode 110 is formed over the common electrode 108 with the interlayer insulation film 109 put between them, and the pixel electrode 110 is covered by an alignment film 113.

In FIG. 11, black matrices 201 are formed on a counter substrate 200. An overcoat film 202 is formed to cover the black matrices 201, and an alignment film 113 is formed over the overcoat film 202. Further, a columnar spacer 130 is formed between the counter substrate 200 and the TFT substrate 100.

In FIG. 11, a seal material 150 is formed at the periphery of the counter substrate 200 and the TFT substrate 100, and a liquid crystal layer 300 is sealed in the inner side of the seal material 150. In FIG. 11, the seal material 150 is formed between the interlayer insulation film 109 of the TFT substrate 100 and the overcoat film 202 of the counter substrate 200. The alignment films 113 do not exist at the portion the seal material 150 is formed. This is because the alignment film 113 has a property of lowering the adhesion of the seal material 150.

In FIG. 11, the alignment film 113 is optically aligned by UV-light at a wavelength of 300 nm or less and the seal material 150 is cured by UV-light at a wavelength of 340 nm or more. At the time the seal material 150 is to be cured, the optical alignment for the alignment film 113 will already be finished. If the UV-Tight at a wavelength of 300 nm or less is applied again to the alignment film 113 after finishing the alignment treatment, the alignment film 113 will deteriorate.

The degradation can be prevented by filtering the UV-light for curing the seal material 150 and use the UV-light that has been cut off the light at a wavelength of 300 nm or less, or by using a UV-light shielding mask to thereby prevent radiation of the UV-light to the alignment film 113. However, forming the filter for UV-light increases the manufacturing cost, and the filter has to be replaced frequently because the UV-light deteriorates the filter. On the other hand, the method of using the light screening mask involves the problem as described herein earlier (refer to SUMMARY OF THE INVENTION).

The present invention described in the following by way of embodiments provides a configuration that can prevent UV-degradation of the alignment film without providing a filter for the UV-light light source and using a light shielding mask upon UV-curing of the seal material.

[Embodiment 1]

Figure 1:
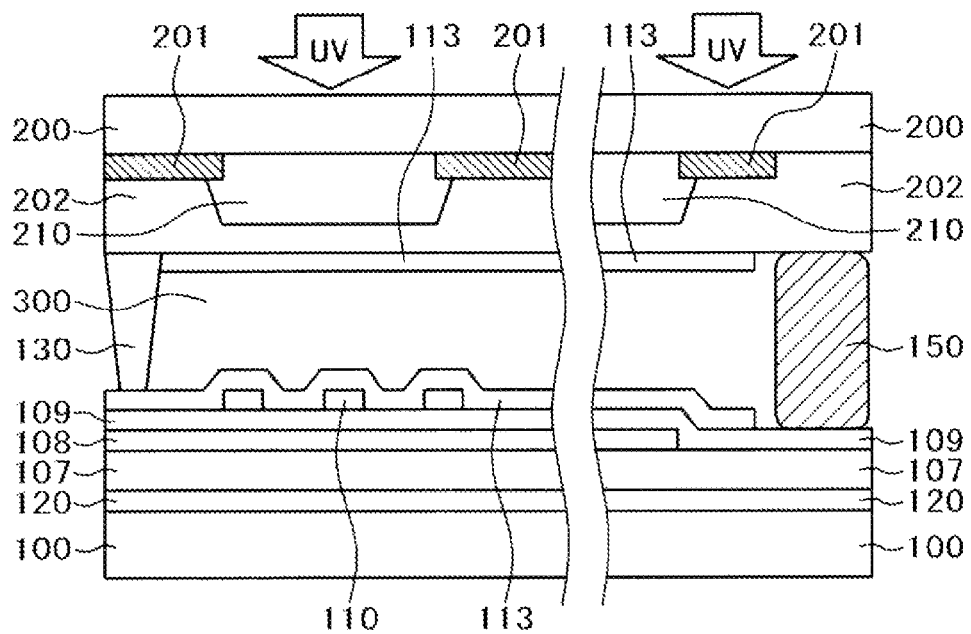
FIG. 1 is a cross sectional view of a liquid crystal display device according to Embodiment 1.

FIG. 1 is a cross sectional view showing the structure of a liquid crystal display device of Embodiment 1. A cross sectional view of the display region is shown on the left and a cross sectional view of the seal portion is shown on the right.

In FIG. 1, a TFT circuit 120 is formed over a TFT substrate 100. The TFT circuit 120 collectively represents the configuration from the gate electrode 101 to the inorganic passivation film 106 in FIG. 9. The same applies to the following drawings.

The device shown in FIG. 1 is a monochromatic liquid crystal display device. Since the configuration of FIG. 1 is identical with that of FIG. 11 except that a UV-light absorption layer 210, a feature of the present invention, is formed between each black matrix 201, detailed description for the structure is omitted. The arrow UV in FIG. 1 represents the UV-light for curing a seal member 150.

Figure 2:
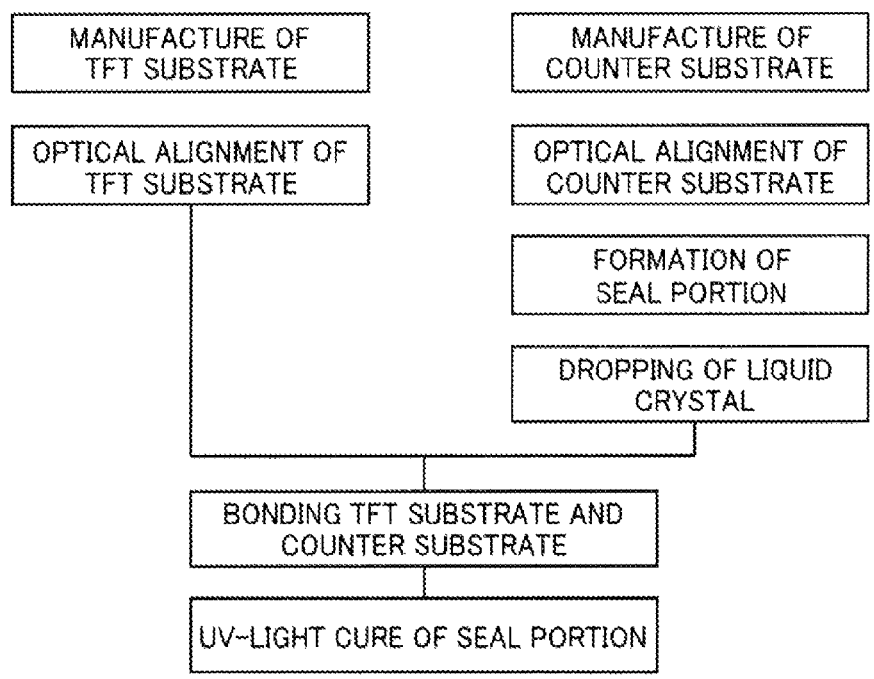
FIG. 2 is a manufacturing process of a liquid crystal display device according to the present invention.

FIG. 2 is a flow of manufacturing of the liquid crystal display device of Embodiment 1. In FIG. 2, the manufacturing flow for the TFT substrate 100 is shown on the left. Since the manufacturing process for the TFT substrate 100 has been described with reference to FIG. 9, details thereof are omitted. After an alignment film 113 is coated over the TFT substrate 100 and then baked, an alignment treatment is performed on the alignment film 113 by using UV-light. A wavelength of the UV-light effective for the alignment treatment is 300 nm or less.

Since the manufacturing process for the counter substrate 200 shown on the right side of FIG. 2 has been described with reference to FIG. 9, its details are omitted. After coating and baking the alignment film 113, an alignment treatment is performed upon the alignment film 113 by using UV-light at a wavelength of 300 nm or less. Then, a seal material 150 is formed on the counter substrate 200 and liquid crystals are dropped into the region surrounded by the seal material 150.

Next, the TFT substrate 100 and the counter substrate 200 are bonded by means of the seal material 150. As shown in FIG. 1, UV-light is radiated on the counter substrate side to cure the seal material 150. A light shielding mask is not used at this process. The seal material 150 reacted and cured by UV-light at a wavelength of 340 nm or more, however, the UV-light used here includes not only UV-light at a wavelength of 340 nm or more but also UV-light at a wavelength of 300 nm or less. In the conventional configuration, when the UV-light includes UV-light at a wavelength of 300 nm or less, the alignment film is degraded if the seal material 150 is cured without using the light shielding mask.

In the portion where a black matrix 201 is formed, the black matrix 210 yields a light shielding effect against the UV-light. However, in the conventional embodiment, since only the overcoat film 202 is present at the portions where the black matrices 201 are not formed, the UV-light at a wavelength of 300 nm or less transmits the overcoat film 202. In this embodiment, a UV-light absorption layer 210 is formed between a black matrix 201 and a black matrix 201 as to shield particularly the UV-light at a wavelength of 300 nm or less. Thus, degradation of the alignment film can be prevented without disposing a light shielding mask.

Figures 3, 4:
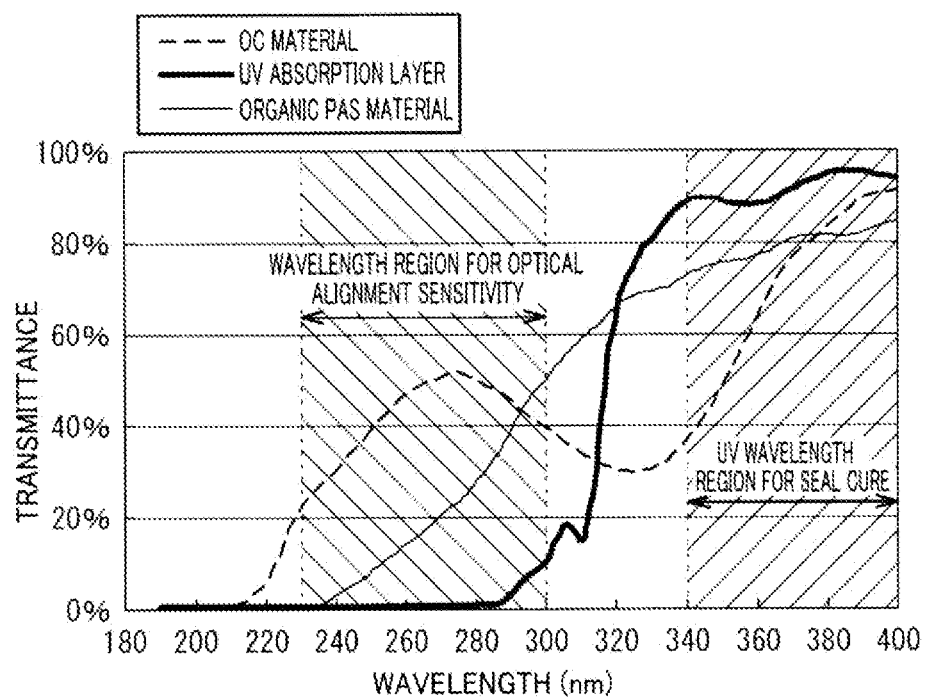
FIG. 3 shows the UV-light transmission characteristic of a UV-light absorption layer relative to wavelength.
FIG. 4 is a table comparing the UV-light transmission characteristics of the liquid crystal display devices of Embodiment 1 and a conventional example.

FIG. 3 is a graph showing the UV-light transmittances of the organic materials used in the present invention: that is, the overcoat film 202 (material for OC), the organic passivation film 107 (organic PAS material), and the UV-light absorption layer 210 (UV absorption layer) which are. As shown in FIG. 3, the transmittance of the UV-light absorption layer 210 is extremely low to UV-light at a wavelength of 300 nm or less. On the other hand, the layer has a high transmittance to UV-light at a wavelength of 340 nm or more.

In FIG. 3, the transmittance of the UV-light absorption layer 210 to the UV-light at a wavelength of 300 nm is 10%, and the transmittance of the UV-light absorption layer 210 to the UV-light at a wavelength of 340 nm is 90%. The values represent those that can be obtained when the UV-light absorption layer 210 has a thickness of 1 μm. The table in FIG. 4 shows the result of an evaluation of the transmittances in the display region and the seal portion of the liquid crystal display device shown in FIG. 1 to the UV-light at a wavelength of 300 nm and at a wavelength of 340 nm, for the conventional example and the present embodiment provided with the UV-light absorption layer 210, respectively.

FIG. 4 shows the intensity of the UV-light that were radiated from the counter substrate 200 side, transmitted through the liquid crystal display device, and then measured at the TFT substrate 100 side.

In FIG. 4, since the configurations of the seal portions 150 of the conventional example and this embodiment are same, the UV-light transmittance is identical. On the other hand, in the display portion, since the UV-light absorption layer 210 exists in this embodiment, while the transmittance to the UV-light at a wavelength of 300 nm is 2.7% in the conventional example, it is lowered to 0.6% in this embodiment. As can be seen from FIG. 3, the transmittance to UV-light at a wavelength of 300 nm or less is further lowered. Therefore, according to this embodiment, since the UV-light at a wavelength of 300 nm or less that affects the alignment film 113 scarcely transmits in the display region, the damage to the alignment film 113 due to the UV-light can be inhibited.

However, the transmittance to the UV-light at a wavelength of 340 nm is 13.6% in the conventional example, whereas it increases to 19.9% in this embodiment. This is because the UV-light absorption layer shows higher transmittance than that of the overcoat film 202 to the wavelength at a wavelength of 340 nm or more. However, since the UV-light at a wavelength of 340 nm or more causes no damage to the alignment film 113, practically there would be no problem.

The table in FIG. 4 shows examples. The film thickness of the UV-light absorption layer 210, etc. actually varies. The effect of the invention can be obtained even when the thickness of the UV-light absorption layer 210 and other elements varies, so long as the transmittance to the UV-light at a wavelength of 300 nm or less in the display region is 1% or lower, and the transmittance to the UV-light at a wavelength of 340 nm in the seal portion is 20% or higher.

[Embodiment 2]

Figures 5, 6:
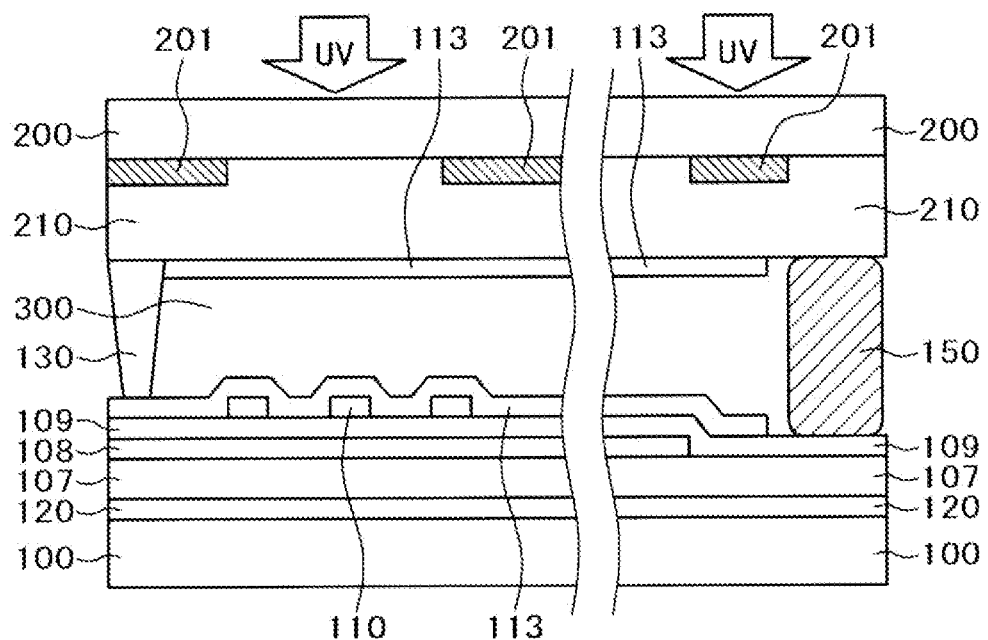
FIG. 5 is a cross sectional view of a liquid crystal display device according to Embodiment 2.
FIG. 6 is a table comparing the UV-light transmission characteristics of the liquid crystal display devices of Embodiment 2 and 1 and the conventional example.

FIG. 5 is a cross sectional view showing the structure of a liquid crystal device of Embodiment 2. A cross sectional view of the display region is shown on the left and the cross sectional view of the seal portion is shown on the right. The configuration of FIG. 5 is different from that of Embodiment 1 in FIG. 1 in that a UV-light absorption layer 210 is formed instead of the overcoat film. In FIG. 5, the UV-light absorption layer 210 is formed not only in the display region but also in the seal portion instead of the overcoat film.

In FIG. 5, after the TFT substrate 100 is bonded to the counter substrate 200 by means of the seal material 150, a UV-light is radiated from the counter substrate 200 side to cure the seal material 150 in the same manner as performed in Embodiment 1. Further, in this embodiment, a light shielding mask for preventing radiation of the UV-light to the display region is not used as with Embodiment 1.

The transmittance of the UV-light absorption layer 210 and the overcoat film 202 to UV-light is as shown in FIG. 3. The UV-light absorption layer 210 has a lower transmittance to UV-light at a wavelength of 300 nm or less and shows a higher transmittance to UV-light at a wavelength of 340 nm or more compared with the overcoat film 202. Accordingly, even if the UV-light is radiated without using a light shielding mask, only an extremely small amount of the UV-light at a wavelength of 300 nm or less reaches the alignment film 113 in the display region. The effect of the UV-light on the alignment film present in the display region is extremely small.

The table shown in FIG. 6 compares the transmittances of UV-light at a wavelength of 300 nm and UV-light at a wavelength of 340 nm in the display portion and in the seal portion of this embodiment and Embodiment 1 and the conventional example. The measuring method is similar to that taken for the measurement for FIG. 4, the UV-light is radiated from the counter substrate 200 side and the degree of transmittance of the UV-light are measured at the TFT substrate 100 side and compared.

In the seal portion 150, different from the conventional example and Embodiment 1, the UV-light absorption layer 210 is formed instead of the overcoat film 202 in this embodiment. While the transmittance to the UV-light at a wavelength of 300 nm is as low as 2.7%, the transmittance to the UV-light at a wavelength of 340 nm is as high as 49.2%. That is, since the UV-light at a wavelength of 340 nm for curing the seal material 150 is less absorbed by the UV-light absorption layer 210, the seal material is irradiated efficiently with the UV-light. Therefore, the seal material 150 can be cured efficiently by the UV-light in this embodiment.

In the display region, regarding the UV-light at a wavelength of 300 nm, since the overcoat film 202 is entirely replaced by the UV-light absorption layer 210, the transmittance is more lowered than that of Embodiment 1, to 0.2%. Accordingly, since the UV-light at a wavelength of 300 nm is cut off more efficiently in this embodiment, damage to the alignment film 113 can be prevented more efficiently. Although the transmittance to the UV-light at a wavelength of 340 nm in the display region is as high as 49.2%, the effect caused by the UV-light at a wavelength of 340 nm on the alignment film is small, so it does not damage the alignment film 113.

As described above, the seal material 150 can be cured by UV-light without damaging the alignment film 113 even when a light shielding mask is not used in this embodiment as well.

As shown in FIG. 5, in this embodiment, a columnar spacer 130 is formed on the UV-light absorption layer 210. By using the same material as the UV-light absorption layer 210 for the columnar spacer 130, the UV-light absorption layer 210 and the columnar spacer 130 can be formed simultaneously.

As an example of this process, a UV-light absorption layer of a thickness equal to the total thickness of the UV-light absorption layer 210 and the columnar spacer 130 is coated over the counter substrate 200. Then, only the portion other than the columnar spacer 130 is removed by etching to a predetermined thickness by controlling the exposure dose in photolithography. The columnar space 130 and the UV-light absorption layer 210 can thus be formed simultaneously in the process of forming the columnar spacer 130, resulting in a reduced manufacturing cost.

[Embodiment 3]

Figure 7:
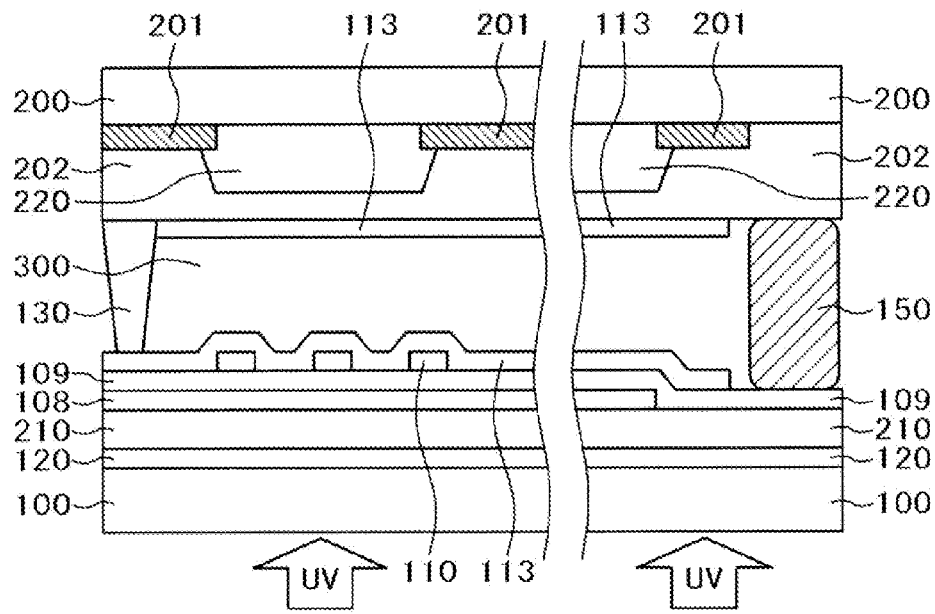
FIG. 7 is a cross sectional view of a liquid crystal display device according to Embodiment 3.

FIG. 7 shows a cross sectional view of a liquid crystal display device of Embodiment 3 according to the invention. Different from Embodiment 1 and Embodiment 2, the device shown in FIG. 7 is a color liquid crystal display device. Color filters 220 are formed between each black matrix 201 in the counter substrate 220. On the other hand, in the TFT substrate 100, a UV light absorption layer 210 is formed instead of an organic passivation film 107. Since other portions have the same configuration as those of Embodiment 1 in FIG. 1, descriptions thereof are omitted.

In this embodiment, a counter substrate 200 having an optically aligned alignment film 113 and a TFT substrate 100 having an optically aligned alignment film 113 are sealed at their periphery with a UV-curable seal material 150. As shown in FIG. 7, UV-light for curing the seal material 150 is radiated from the TFT substrate 100 side. The relationship of the UV-light transmittances of the organic passivation film 107 and the UV-light absorption layer 210 are as shown in FIG. 3. That is, the UV-light absorption layer 210 efficiently cuts off the UV-light at a wavelength of 300 nm or less, and it efficiently transmits the UV-light at a wavelength of 340 nm or more, compared with the organic passivation film 107.

In the configuration shown in FIG. 7, when UV-light is radiated from the TFT substrate 100 side, since the UV-light absorption layer 210 is formed instead of the organic passivation film 107 at the TFT substrate 100 side, UV-light at a wavelength of 300 nm or less which may damage the alignment film 113 is efficiently cut off in the display region. Although UV-light at a wavelength of 340 nm or more is more likely to transmit through the UV-light absorption layer 210 in the display region, the UV-light at a wavelength of 340 nm or more does not damage the alignment film 113, so there is no problem.

On the other hand, for the seal material 150 at the seal portion, since the UV-light absorption layer 210 formed over the TFT substrate 100 has higher transmittance to the UV-light at a wavelength of 340 nm or more, the seal material 150 can be cured efficiently. While also the UV-light at a wavelength of 300 nm or less is less radiated to the seal material 150, the UV-light within this range causes less effect on the curing of the seal material. Thus, no problem arises.

As described above, the seal material 150 can be cured by UV-light with no damage on the alignment film 113 due to the UV-light radiation without using a light shielding material in this embodiment as well.

[Embodiment 4]

Figure 8:
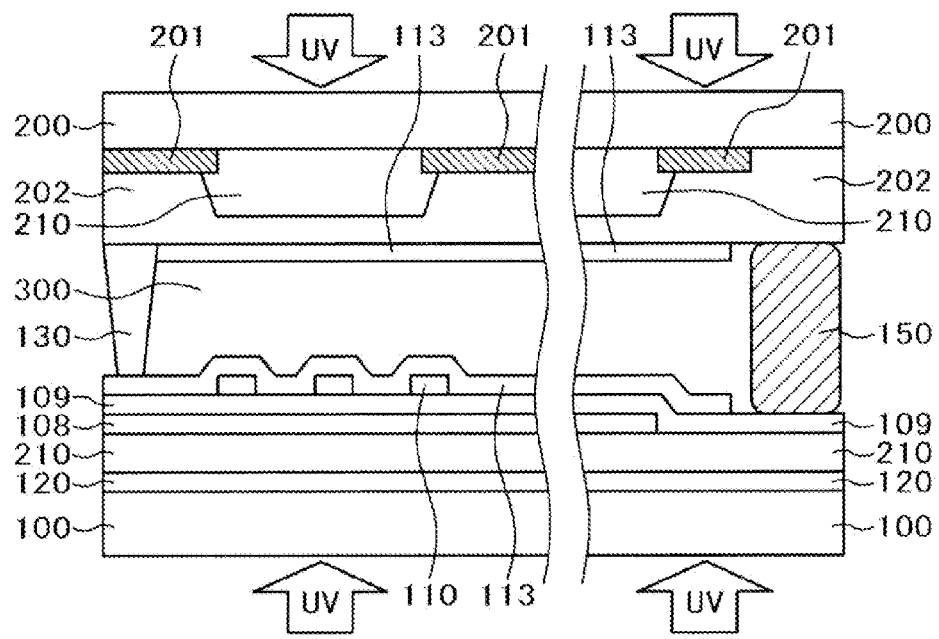
FIG. 8 is a cross sectional view of a liquid crystal display device according to Embodiment 4.

FIG. 8 is a cross sectional view of a liquid crystal display device showing Embodiment 4 of the invention. The device shown in FIG. 8 is also a monochromatic liquid display device as with those of Embodiment 1 and Embodiment 2. In FIG. 8, a UV-light absorption layer 210 is formed between each black matrix 201 as in Embodiment 1. On the other hand, a UV-light absorption layer 210 is formed instead of an organic passivation film 107 at the TFT substrate 100 side as with Embodiment 3. That is, this embodiment has a configuration such that the UV-light at a wavelength of 300 nm or less is efficiently cut off at both the counter substrate 200 side and TFT substrate 100 side, and the transmittance to the UV-light at a wavelength of 340 nm or more is high also at both sides.

In this embodiment; UV-light can be radiated from both the counter substrate 200 side and the TFT substrate 100 side as shown in FIG. 8. Since it is adapted such that the UV-light at a wavelength of 300 nm or less is efficiently cut off at both the counter substrate 200 side and the TFT substrate 100 side, the UV-light does not damage the alignment film 113.

On the other hand, the UV-light at a wavelength of 340 nm or higher is transmitted efficiently, particularly in the TFT substrate 100 side. Further, also in the counter substrate 200 side, the transmittance of the seal portion 3 to the UV-light at a wavelength of 340 nm or more is maintained at a level equivalent to that of the conventional example.

Therefore, according to this embodiment, since the radiation dose of the UV-light at a wavelength of 340 nm or more to the seal material 150 can be increased remarkably, the seal material 150 can be cured by UV-light within a shorter time period. Further, the seal material 150 can be cured by UV-light with no damage to the alignment film 113 without using a light shielding mask as with Embodiment 1 to 3.

What is claimed is:

1. A liquid crystal display device comprising:
   a TFT substrate having an alignment film;
   a counter substrate having an alignment film, the counter substrate being bonded to the TFT substrate by means of a seal material; and
   liquid crystals sealed inside the substrates and the seal material;
   wherein a UV-light absorption layer is formed between each black matrix, the black matrices and the UV-light absorption layer being covered by an overcoat film, the overcoat film being covered by the alignment film;
   the seal material is a UV-light curable resin; and
   the transmittance of the UV-light absorption layer to UV-light at a wavelength of 300 nm is lower than that of the overcoat film, and the transmittance of the UV-light absorption layer to UV-light at a wavelength of 340 nm is higher than that of the overcoat film.

2. A liquid crystal display device comprising:
a TFT substrate having an alignment film;
a counter substrate having an alignment film, the counter substrate being bonded to the TFT substrate by means of a seal material; and
liquid crystals sealed inside the substrates and the seal material;
wherein a UV-light absorption layer is formed between each black matrix and over the black matrices, and the alignment film is formed over the UV-light absorption layer;
the TFT substrate is covered by a TFT circuit and an organic passivation film covering the TFT circuit, and over the organic passivation film, counter electrodes, an interlayer insulation film, and pixel electrodes are formed in that order, or in the order of the pixel electrodes, the interlayer insulation film, and the counter electrodes;
the alignment film is formed over the pixel electrodes or the counter substrate;
the seal material is a UV-light curable resin; and
the transmittance of the UV-light absorption layer to UV-light at a wavelength of 300 nm is lower than that of the organic passivation film, and the transmittance of the UV-light absorption layer to UV-light at a wavelength of 340 nm is higher than that of the organic passivation film.

3. A liquid crystal display device comprising:
a TFT substrate having an alignment film;
a counter substrate having an alignment film, the counter substrate being bonded to the TFT substrate by means of a seal material; and
liquid crystals sealed inside the substrates and the seal material;
wherein a color filter is formed between each black matrix, the black matrices and the color filters being covered by an overcoat film, the overcoat film being covered by the alignment film;
the TFT substrate is covered by a TFT circuit and a UV-light absorption layer covering the TFT circuit, and over the UV-light absorption layer, counter electrodes, an interlayer insulation film, and pixel electrodes are formed in that order, or in the order of the pixel electrodes, the interlayer insulation film, and the counter electrodes;
the alignment film is formed over the pixel electrodes or the counter substrate;
the seal material is a UV-curable resin; and
the transmittance of the UV-light absorption layer to UV-light at a wavelength of 300 nm is lower than that of the overcoat film, and the transmittance of the UV-light absorption layer to UV-light at a wavelength of 340 nm is higher than that of the overcoat film.

4. A liquid crystal display device comprising:
a TFT substrate having an alignment film;
a counter substrate having an alignment film, the counter substrate being bonded to the TFT substrate by means of a seal material; and
liquid crystals sealed inside the substrates and the seal material;
wherein a UV-light absorption layer is formed between each black matrix, the black matrices and the UV-light absorption layer being covered by an overcoat film, the overcoat film being covered by the alignment film;
the TFT substrate is covered by a TFT circuit and a UV-light absorption layer covering the TFT circuit, and over the UV-light absorption layer, counter electrodes, an interlayer insulation film, and pixel electrodes are formed in that order, or in the order of the pixel electrodes, the interlayer insulation film, and the counter electrodes;
the alignment film is formed over the pixel electrodes or the counter substrate;
the seal material is a UV-curable resin; and
the transmittance of the UV-light absorption layer to UV-light at a wavelength of 300 nm is lower than that of the overcoat film and that of the organic passivation layer, and the transmittance of the UV-light absorption layer to UV-light at a wavelength of 340 nm is higher than that of the overcoat film and that of the organic passivation layer.

5. A liquid crystal display device according to claim 1, wherein:
the seal material is a UV-curable resin that is cured by UV-light at a wavelength of 340 nm or more; and
the alignment film is optically aligned by UV-light at a wavelength of 300 nm or less.

6. A liquid crystal display device according to claim 2, wherein:
the seal material is a UV-curable resin that is cured by UV-light at a wavelength of 340 nm or more; and
the alignment film is optically aligned by UV-light at a wavelength of 300 nm or less.

7. A liquid crystal display device according to claim 3, wherein:
the seal material is a UV-curable resin that is cured by UV-light at a wavelength of 340 nm or more; and
the alignment film is optically aligned by UV-light at a wavelength of 300 nm or less.

8. A liquid crystal display device according to claim 4, wherein:
the seal material is a UV-curable resin that is cured by UV-light at a wavelength of 340 nm or more; and
the alignment film is optically aligned by UV-light at a wavelength of 300 nm or less.

* * * * *

UNITED STATES PATENT AND TRADEMARK OFFICE
CERTIFICATE OF CORRECTION

PATENT NO. : 8,593,596 B2  
APPLICATION NO. : 13/397841  
DATED : November 26, 2013  
INVENTOR(S) : Kunimatsu et al.

Page 1 of 1

It is certified that error appears in the above-identified patent and that said Letters Patent is hereby corrected as shown below:

In the Specification:
Column 1, line 31, change "front, when," to --front when--;
Column 5, line 63, change "a TFT" to --as a TFT--;
Column 6, line 26, change "UV-Tight" to --UV-light--; and
Column 10, line 28, change "embodiment;" to --embodiment,--.

Signed and Sealed this
Twenty-fifth Day of February, 2014

Michelle K. Lee
*Deputy Director of the United States Patent and Trademark Office*